United States Patent
Rupasinghe et al.

(10) Patent No.: US 11,888,564 B2
(45) Date of Patent: Jan. 30, 2024

(54) METHOD FOR QUANTIZATION OF COMBINATION COEFFICIENTS ASSOCIATED WITH FREQUENCY DOMAIN COMPRESSION

(71) Applicants: NTT DOCOMO, INC., Tokyo (JP); DOCOMO INNOVATIONS, INC., Palo Alto, CA (US)

(72) Inventors: Nadisanka Rupasinghe, Tokyo (JP); Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 341 days.

(21) Appl. No.: 17/292,021

(22) PCT Filed: Nov. 21, 2019

(86) PCT No.: PCT/US2019/062651
§ 371 (c)(1),
(2) Date: May 7, 2021

(87) PCT Pub. No.: WO2020/106981
PCT Pub. Date: May 28, 2020

(65) Prior Publication Data
US 2021/0399781 A1  Dec. 23, 2021

Related U.S. Application Data

(60) Provisional application No. 62/797,811, filed on Jan. 28, 2019, provisional application No. 62/770,731, filed on Nov. 21, 2018.

(51) Int. Cl.
*H04B 7/06* (2006.01)
*H04L 27/26* (2006.01)

(52) U.S. Cl.
CPC ......... *H04B 7/0626* (2013.01); *H04B 7/0634* (2013.01); *H04B 7/0641* (2013.01); *H04B 7/0663* (2013.01); *H04L 27/2636* (2013.01)

(58) Field of Classification Search
None
See application file for complete search history.

(56) References Cited

U.S. PATENT DOCUMENTS

| | | | |
|---|---|---|---|
| 6,771,828 B1 * | 8/2004 | Malvar | H04N 19/60 382/248 |
| 2016/0119045 A1 | 4/2016 | Rahman et al. | |
| 2018/0034519 A1 | 2/2018 | Rahman et al. | |

OTHER PUBLICATIONS

Office Action issued in Japanese Application No. 2021-528345; dated Jul. 5, 2022 (8 pages).
International Search Report issued in Application No. PCT/US2019/062651, dated Feb. 25, 2020 (5 pages).
(Continued)

*Primary Examiner* — Minh Trang T Nguyen
(74) *Attorney, Agent, or Firm* — Osha Bergman Watanabe & Burton LLP (57) ABSTRACT

A wireless communication method for a terminal, a terminal, and a wireless communication system receive one or more Channel State Information Reference Signals (CSI-RSs). Further, quantization of combination coefficients of the one or more CSI-RSs corresponding to one or more spatial beams Discrete Fourier Transform (DFT) basis vector amplitudes is performed.

5 Claims, 7 Drawing Sheets

(56) References Cited

OTHER PUBLICATIONS

Written Opinion issued in International Application No. PCT/US2019/062651, dated Feb. 25, 2020 (8 pages).
3GPP TS 38.214 V15.3.0, Release 15; "3rd Generation Partnership Project; Technical Specification Group Radio Access Network; NR; Physical layer procedures for data;" Sep. 2018; Sophia Antipolis Valbonne, France (96 pages).
3GPP TSG RAN WG1 Meeting #98; "RAN1 Chairman's Notes;" Aug. 26-30, 2019; Prague, CZ (113 pages).
3GPP TSG RAN WG1 Meeting #94-bis; R1-1811406; "CSI Enhancements for MU-MIMO Support;" Nokia, Nokia Shanghai Bell; Oct. 8-12, 2018; Chengdu, People's Republic of China (13 pages).
3GPP TSG RAN WG1 Meeting #88bis; R1-1705076; "Design for Type II Feedback;" Huawei, HiSilicon; Apr. 3-7, 2017; Spokane, USA (11 pages).
3GPP TSG RAN WG1 Meeting #88bis; R1-1705899; "Type II CSI feedback;" Ericsson; Apr. 3-7, 2017; Spokane, U.S. (17 pages).
International Preliminary Report on Patentability for corresponding International Application No. PCT/US2019/062651, dated Jun. 3, 2021 (10 pages).
Office Action in the counterpart Chinese Application No. 201980084943.8, dated May 4, 2023 (20 pages).

\* cited by examiner

| $k_{l,i}^{(1)}$ | $p_{l,i}^{(1)}$ |
|---|---|
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

$n = 3$ bits

FIG. 3

| $k_{l,i}^{(1)}$ | $p_{l,i}^{(1)}$ |
|---|---|
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

$m = 3$ bits

FIG. 4

| $k^{(2)}_{l,i}$ | $p^{(2)}_{l,i}$ |
|---|---|
| 0 | $\sqrt{1/2}$ |
| 1 | 1 |

$q^a_0 = 1$ bit

METHOD FOR QUANTIZATION OF COMBINATION COEFFICIENTS ASSOCIATED WITH FREQUENCY DOMAIN COMPRESSION

CROSS-REFERENCE TO RELATED APPLICATIONS

This application claims priority to U.S. Provisional Patent Application Ser. No. 62/770,731, titled "Method for Quantization of Combination Coefficients Associated with Frequency Domain Compression," which was filed on Nov. 21, 2018, and U.S. Provisional Patent Application Ser. No. 62/797,811, titled "Method for Quantization of Combination Coefficients Associated with Frequency Domain Compression," which was filed on Jan. 28, 2019. Both of the priority applications are incorporated herein by reference in their entirety.

TECHNICAL FIELD

One or more embodiments disclosed herein relate to a method for quantization of combination coefficients associated with frequency domain compression.

BACKGROUND ART

New Radio (NR; fifth generation (5G) radio access technology) supports Type II Channel State Indicator (CSI) feedback. Fraction of overhead allocations for sub-band (SB) reporting in NR Rel. 15 Type II CSI scheme can be calculated as follows:

For Rank 1, the fraction of overhead for L=2, K=4 is 120/142%≈85%;

For Rank 1, the fraction of overhead for L=4, K=6 is 240/279%≈86%;

For Rank 2, the fraction of overhead for L=2, K=8 is 240/273%≈87%; and

For Rank 2, the fraction of overhead for L=4, K=12 is 480/543%≈88%.

The above analysis indicates that considerable fraction of the total overhead is occupied by SB amplitude and phase reporting.

Type II CSI precoding vector for N_SB SBs may be generated by single layer transmission as in the following equation.

$$W(N_t \times N_{SB}) = W_{space} W_{coeff} \quad \text{(Equation 1)}$$

In Equation 1, $W_{space}$ ($N_t \times 2L$) represents wideband spatial 2D-DFT beams, L represents the beam number, $N_t$ represents the number of ports, and $W_{coeff}$ ($2L \times N_{SB}$) represents the SB complex combination coefficient matrix.

Considering frequency domain (FD) compression, information within $W_{coeff}$ can be further compressed.

In the Type II CSI feedback, precoding vectors for $N_{SB}$ sub-bands (SBs) considering FD compression can be given as the following equation:

$$W(N_t \times N_{SB}) = W_{space} \tilde{W} W_{freq}^T \quad \text{(Equation 2)}$$

In Equation 2, $N_t$ represents the number of ports, $W_{freq}$ ($N_{SB} \times M$) represents a matrix containing DFT basis vectors (FD components), M ($\ll N_{SB}$) represents the number of DFT basis vectors. $\tilde{W}$ ($2L \times M$) represents a matrix consisting of complex combination coefficients.

As shown in Equation 2, $W_{coeff}$ is represented as $\tilde{W} W_{freq}^T$ using few DFT basis vectors and the combination coefficients.

In order to reduce the feedback overhead, it is essential to properly quantize and report necessary complex linear combination coefficients in $\tilde{W}$.

As can be seen from (Equation 2), FD compression is associated with complex combination coefficients captured within $\tilde{W}$, i.e., $c_{p,l,d}$ is the combination coefficient for p-th polarization, l-th spatial beam, and d-th DFT basis vector. However, not all coefficients of $\tilde{W}$ may be reported. In fact, only $K_0 = \lceil \beta \times 2LM \rceil$, $\beta \in \{3/4, 1/2, 1/4\}[1]$ out of 2LM coefficients will be reported.

In order to reduce the overhead associated with reporting the $c_{p,l,d}$ $p \in \{1,2,3,4\}$, $l \in \{1, \ldots, 2L\}$, $d \in \{1, \ldots, M\}$ complex coefficients, a proper quantization approach may be essential. In one example, amplitude and phase of the aforementioned $K_0$ (<2LM) complex coefficients can be quantized separately.

For example, amplitude and phase of the $K_0$ complex coefficients can be quantized separately.

However, in order to reduce the associated overhead while keeping the quantized value as close as possible to the exact value of the coefficient, it is important to identify some proper quantization mechanisms.

CITATION LIST

Non-Patent Reference

[Non-Patent Reference 1] 3GPP TS 38.214 V15.3.0 (2018-09); NR; Physical layer procedures for data (Release 15)

[1] 3GPP RAN1 #98, "RAN1 Chairman's Notes," August, 2019

SUMMARY OF THE INVENTION

One or more embodiments of the present invention relate to a wireless communication method for a user equipment (UE) that includes receiving one or more Channel State Information Reference Signals (CSI-RS) and performing quantization of combination coefficients of the one or more CSI-RSs based on wideband (WB) amplitudes corresponding to one or more spatial beams Discrete Fourier Transform (DFT) basis vector amplitudes.

One or more embodiments of the present invention relate to a wireless communication method for a user equipment (UE) that includes receiving one or more Channel State Information Reference Signals (CSI-RS) and performing quantization of combination coefficients of the one or more CSI-RSs based on Discrete Fourier Transform (DFT) basis vector amplitudes corresponding to one or more spatial beams.

One or more embodiments of the present invention relate to a wireless communication system that includes a base station having a transmitter that transmits one or more Channel State Information Reference Signals (CSI-RS). The system may further include a user equipment (UE) having a receiver that receives one or more Channel State Information Reference Signals (CSI-RS); and a processor that performs quantization of combination coefficients of the one or more CSI-RSs based on wideband (WB) amplitudes corresponding to one or more spatial beams Discrete Fourier Transform (DFT) basis vector amplitudes.

One or more embodiments of the present invention relate to a wireless communication system including a base station having a transmitter that transmits one or more Channel State Information Reference Signals (CSI-RS). The system may further include a user equipment (UE) having a receiver that receives one or more Channel State Information Reference Signals (CSI-RS) and a processor that performs quantization of combination coefficients of the one or more CSI-RSs based on Discrete Fourier Transform (DFT) basis vector amplitudes corresponding to one or more spatial beams.

One or more embodiments of the present invention provide a method and system that can identify some proper quantization mechanisms to reduce an associated overhead while keeping a quantized value as close as possible to an exact coefficient.

Other embodiments and advantages of the present invention will be recognized from the description and figures.

DETAILED DESCRIPTION OF EMBODIMENTS

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Additionally, one skilled in the art will appreciate that various terminology may be used interchangeably such as, for example, determines and assumes.

A wireless communication system 1 according to one or more embodiments of the present invention will be described below with reference to FIG. 1.

Figure 1:
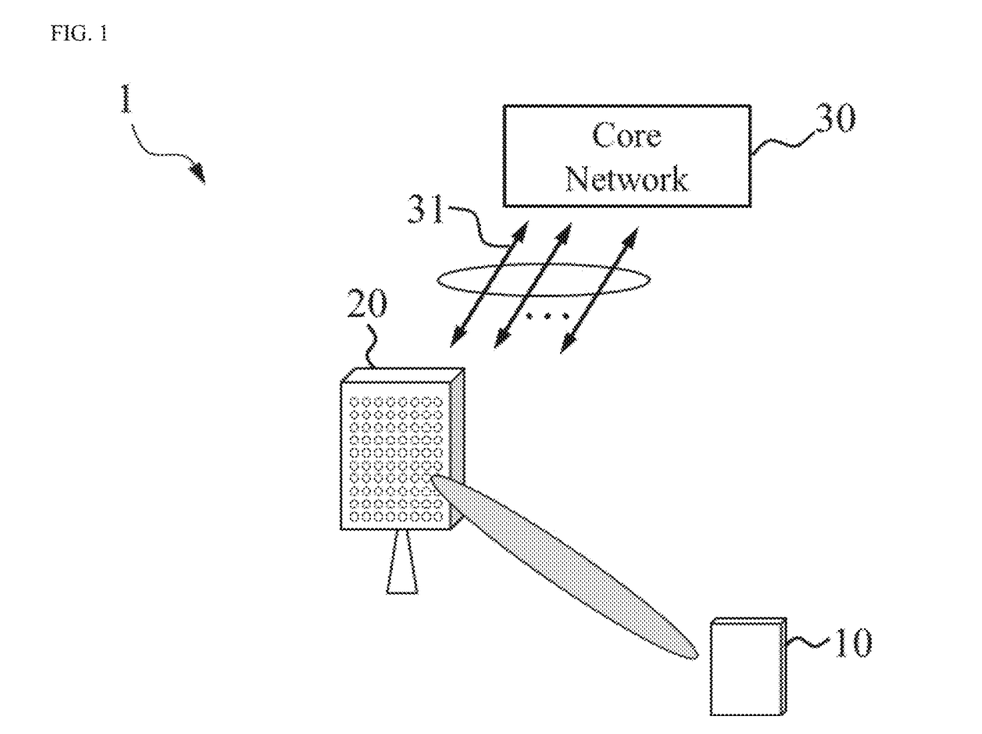
FIG. 1 is a diagram showing a configuration of a wireless communication system according to one or more embodiments of the present invention.

As shown in FIG. 1, the wireless communication system 1 includes a UE 10, a BS 20, and a core network 30. The wireless communication system 1 may be an NR system or a Long Term Evolution (LTE)/LTE-Advanced (LTE-A) system.

The BS 20 communicates with the UE 10 via multiple antenna ports using a multiple-input and multiple-output (MIMO) technology. The BS 20 may be gNodeB (gNB) or Evolved NodeB (eNB). In embodiments of the present invention, the BS 20 may be referred to as a network (NW). The BS 20 receives downlink packets from a network equipment such as upper nodes or servers connected on the core network 30 via an access gateway apparatus, and transmits the downlink packets to the UE 10 via the multiple antenna ports. The BS 20 receives uplink packets from the UE 10 and transmits the uplink packets to the network equipment via the multiple antenna ports.

The BS 20 includes antennas for MIMO to transmit radio signals between the UE 10, a communication interface to communicate with an adjacent BS 20 (for example, X2 interface), a communication interface to communicate with the core network (for example, S1 interface), and a CPU (Central Processing Unit) such as a processor or a circuit to process transmitted and received signals with the UE 10. Functions and processing of the BS 20 described below may be implemented by the processor processing or executing data and programs stored in a memory. However, the BS 20 is not limited to the hardware configuration set forth above and may include any appropriate hardware configurations. Generally, a plurality of the BSs 20 may be disposed so as to cover a broader service area of the wireless communication system 1.

The UE 10 communicates with the BS 20 using the MIMO technology. The UE 10 transmits and receives radio signals such as data signals and control signals between the BS 20 and the UE 10. The UE 10 may be a mobile station, a smartphone, a cellular phone, a tablet, a mobile router, or information processing apparatus having a radio communication function such as a wearable device.

The UE 10 includes a CPU such as a processor, a RAM (Random Access Memory), a flash memory, and a radio communication device to transmit/receive radio signals to/from the BS 20 and the UE 10. For example, functions and processing of the UE 10 described below may be implemented by the CPU processing or executing data and programs stored in a memory. The UE 10 is not limited to the hardware configuration set forth above and may be configured with, e.g., a circuit to achieve the processing described below.

A method according to one or more embodiments of the present invention may cause an amplitude of the (l, d)-th combination coefficient to be $a_{p,l,d}$ (for p-th polarization). This can then be approximately given as the following equation:

$$a_{p,l,d} \approx a_l^{WB} \tilde{a}_{p,l,d} a_d^{FD} \quad \text{(Equation 3)}$$

In Equation 3, $a_l^{WB}$ represents a wide band amplitude of l-th spatial beam and is indicated using n bits, $a_d^{FD}$ represents an amplitude of d-th DFT basis vector and indicated m bits, and, $\tilde{a}_{p,l,d}$ represents differential amplitudes of (l, d)-th combination coefficient.

In one or more embodiments of the present invention, different quantization may be considered for differential amplitudes and/or phases. In particular, for $K_1$ strongest coefficients $q_0^a$ ($q_0^P$) bits are used for amplitude (phase) quantization. For the other ($K_0$-$K_1$) coefficients, $q_1^a$ ($q_1^P$) bits are used for amplitude (phase) quantization. In some examples, the strongest coefficients may be selected from the amplitudes of unquantized or quantized $K_0$ coefficients.

First Example: n-Bit Wideband Amplitude

According to one or more embodiments of a first example of the present invention, for each 2D-DFT spatial beam, n-bit wideband (WB) amplitude may be identified.

Figure 2:
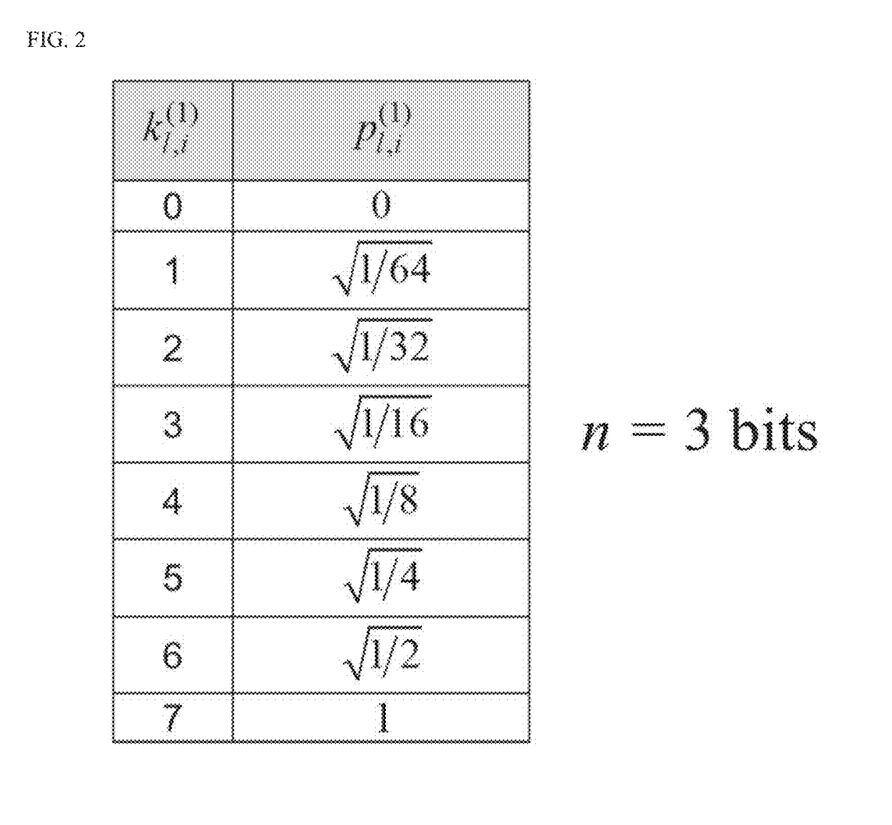
FIG. 2 is a diagram showing a table that defines a set of values according to one or more embodiments of a first example of the present invention.

In Option 1 of the first example, n may be based on a set of predetermined values. For example, in one or more embodiments, the set of predetermined values may be defined in the 3GPP specification such as in Table 5.2.2.2.3-2 of 3GPP TS 38.214 as shown in FIG. 2.

In Option 2 of the first example, there can be multiple tables with different amplitude values specified (for example, Option 1 shows one such possible table). Using x-bit(s) in downlink control information (DCI) or higher layer signaling, the network (NW) informs the UE of which table to use. In this case, n may depend on the number of values in the informed table. For example, if 4 values are in the table, n=2 bits; if 8 values, n=3 bits, etc.

In Option 3 of the first example, the UE assumes to be configured a set of such tables (as in Option 1) by higher layer parameter(s). Further, the UE may assume the table to use as indicated by x-bit(s) in DCI or by higher layer signaling. In this case, n depends on the number of values in the informed table. For example, if 4 values are in the table, n=2 bits. For example, if 8 values in the table, n=3 bits.

In Option 4 of the first example, if any of the above options are not configured, the UE assumes Option 1.

Second Example: m-bit FD Component Amplitude

According to one or more embodiments of a second example of the present invention, for each DFT basis vector (FD component), m-bit amplitude may be identified.

Figure 3:
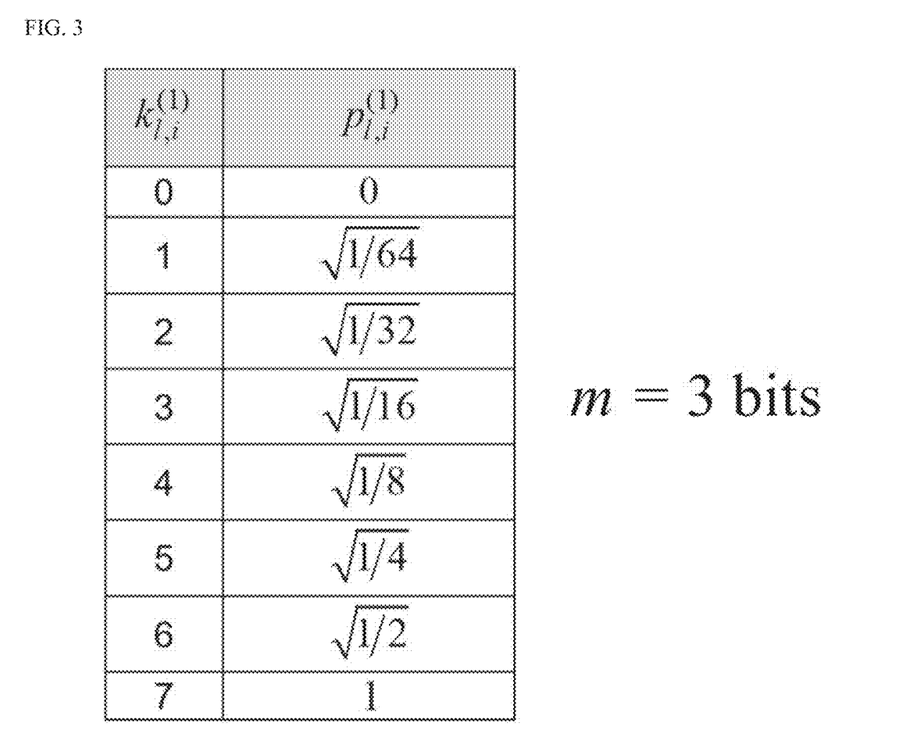
FIG. 3 is a diagram showing a table that defines a set of values according to one or more embodiments of a second example of the present invention.

In Option 1 of the second example, m is based on a set of predetermined values. In one or more embodiments, the set of values may be defined in the 3GPP specification such as in Table 5.2.2.2.3-2 of 3GPP TS 38.214 as shown in FIG. 3.

In Option 2 of the second example, there can be multiple tables with different amplitude values specified (for example, Option 1 shows one such possible table). Using x-bit(s) in DCI or in higher layer signaling, the NW informs the UE of the table to use. In this case, m depends on the number of values in the informed table. For example, if 4 values are in the table, m=2 bits. For example, if 8 values in the table, m=3 bits.

In Option 3 of the second example, the UE assumes to be configured for a set of such tables (as in Option 1) by higher layer parameter(s) and the UE assumes the table to use as indicated by x-bit(s) DCI or by higher layer signaling. In this case, m depends on the number of values in the informed table. For example, if 4 values are in the table, m=2 bits. For example, if 8 values are in the table, m=3 bits.

In Option 4 of the second example, if any of the above Options 1-3 are not configured, the UE may assume that it is not required to report amplitudes for DFT basis vectors and only send WB amplitudes and differential coefficient amplitudes Third Example: Differential Amplitude for $K_1$ Strongest Coefficients According to one or more embodiments of a third example of the present invention, for $K_0$ (<2LM) reporting coefficients, the differential amplitude (with reference to WB amplitude and FD component amplitude) quantization can be achieved as follows.

For $K_1$ (<$K_0$) leading (strongest) coefficients, differential amplitude quantization with $q_0^a$-bits may be performed.

Figure 4:
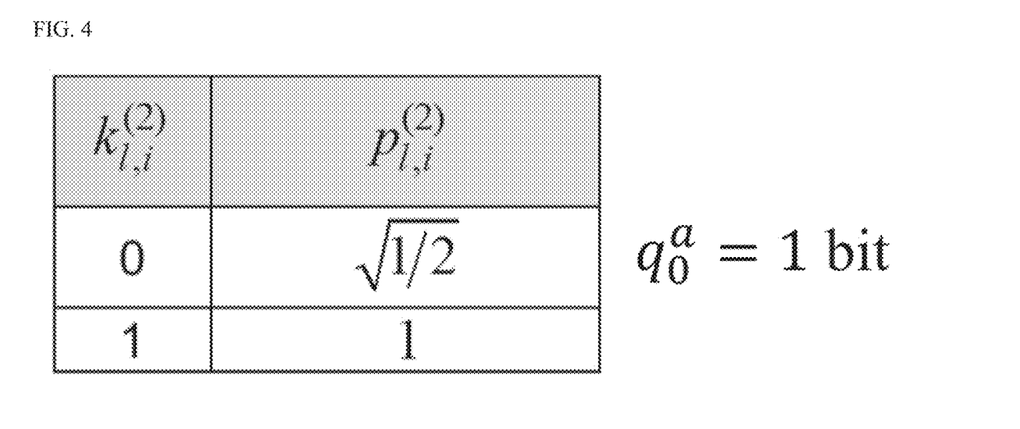
FIG. 4 is a diagram showing a table that defines a set of values according to one or more embodiments of a third example of the present invention.

In Option 1 of the third example, $q_0^a$ is based on a set of one or more predetermined values. For example, in one or more embodiments, the set of one or more predetermined values is defined in the in the 3GPP specification such as in Table 5.2.2.2.3-3 of 3GPP TS 38.214 as shown in FIG. 4.

In Option 2 of the third example, there can be multiple tables with different amplitude values specified (for example, Option 1 shows one such possible table). Using x-bit(s) in DCI or using higher layer signaling, NW informs the UE of the table to use. In this case, $q_0^a$ depends on the number of values in the informed table. For example, if 2 values are in the table, $q_0^a$=1 bit.

In Option 3 of the third example, the UE assumes to be configured with a set of such tables (as in Option 1) by higher layer parameter(s). Further, the UE assumes the table to use as indicated by x-bit(s) DCI or by higher layer signaling. In this case, $q_0^a$ depends on the number of values in the informed table. For example, if 2 values are in the table, $q_0^a$=1 bit.

In Option 4 of the third example, for all $K_0$ coefficients, 1 or 0 (i.e., 1 bit) is fed back as the differential amplitude. For example, the amplitude of the (l, d)-th combination coefficient would be $a_{p,l,d} = a_l^{WB} a_d^{FD}$ if 1 is selected as the differential amplitude.

In Option 5 of the third example, if $K_1$ is not configured, the UE may assume and apply Option 4.

Fourth Example: Phase Quantization for Strongest, $K_1$ Coefficients

According to one or more embodiments of a fourth example of the present invention, phase quantization with $q_0^p$-bits may be performed for the strongest $K_1$ coefficients. In this case, $q_0^p$ depends on the selected phase quantization, i.e., Quadrature Phase Shift Keying (QPSK), 8 Phase Shift Keying (PSK) or 16 PSK which is configured from the higher layer signaling. For example, if 8 PSK is configured, $q_0^p$=3 bit used for phase reporting for strongest K coefficients.

In Option 1 of the fourth example, $q_0^p$ may be based on a predetermined phase quantization. For example, in one or more embodiments, the predetermined phase quantization may be defined in the 3GPP specifications. For example, as noted above, the predetermined phase quantization may be QPSK, 8PSK, 16PSK, or the like. In the example of 8PSK, then $q_0^p$=3 bits, and in the example of 16PSK, then $q_0^p$=4 bits.

In Option 2 of the fourth example, there may be multiple phase quantization(s) specified (e.g., 8PSK, 16PSK). In this example, using x-bit(s) in DCI or using higher layer signaling, the NW may inform the UE of which phase quantization to use. In this case, $q_0^p$ depends on the informed phase quantization. For example, if 8PSK is informed then $q_0^p$=3 bits or if 16PSK is informed, then $q_0^p$=4 bits.

In Option 3 of the fourth example, all of the $K_0$ coefficients are quantized with the same phase quantization. Accordingly, in this example $q_0^p$=$q_1^p$. For example, if QPSK, then $q_0^p$=$q_1^p$=2 bits or if 8PSK, then $q_0^p$=$q_1^p$=3 bits. Here, $q_1^p$ is the number of quantization bits for ($K_0$-$K_1$) linear combination coefficients.

In Option 4 of the fourth example, if $K_1$ is not configured then the UE may assume and apply Option 3.

Fifth Example: Differential Amplitude for Other ($K_0$-$K_1$) Coefficients

For example, for other ($K_0$-$K_1$) coefficients, differential amplitude quantization with $q_1^a$ bits may be performed.

In Option 1 of the fifth example, $q_1^a$ is based on one or more sets of predetermined values. For example, in one or more embodiments, the one or more sets of predetermined values may be defined in the in the 3GPP specifications.

In Option 2 of the fifth example, there can be multiple tables with different amplitude values specified (for example, Option 1 shows one such table). Using x-bit(s) in DCI or using higher layer signaling, the NW informs the UE of which table to use. In this case, $q_1^a$ depends on the number of values in the informed table. For example, if 2 values are in the table, $q_1^a=1$ bit.

In Option 3 of the fifth example, the UE assumes to be configured with a set of such tables (such as in Option 1) by a higher layer parameter or as indicated by x-bit(s) DCI. In this case, $q_1^a$ depends on the number of values in the informed table. For example, if 2 values are in the table, $q_1^a=1$ bit.

In Option 4 of the fifth example, for all $K_0$ coefficients, a 1 or 0 (1 bit) is fed back as the differential amplitude. For example, amplitude of the (l, d)-th combination coefficient would be $a_{p,l,d} \approx a_l^{WB} a_d^{FD}$ if 1 is selected as the differential amplitude.

As Option 5 of the fifth example, if any of the above options are not configured, the UE may assume and apply Option 4.

Sixth Example: Phase Quantization for Other $K_0$-$K_1$ Coefficients

According to one or more embodiments of a fourth example of the present invention, phase quantization with $q_1^p$-bits may be performed for $K_0$-$K_1$ coefficients. In this case, $q_1^p$ depends on the selected phase quantization, i.e., QPSK, 8PSK, or 16PSK which is configured from the higher layer signaling. For example, if 8 PSK is configured, $q_1^p=3$ bits used for phase reporting for $K_0$-$K_1$ coefficients.

In Option 1 of the sixth example, $q_1^p$ may be based on a predetermined phase quantization. For example, in one or more embodiments, the predetermined phase quantization may be defined in the 3GPP specifications. For example, as noted above, the predetermined phase quantization may be QPSK, 8PSK, 16PSK, or the like. In the example of 8PSK, then $q_0^p=3$ bits, and in the example of 16PSK, then $q_0^p=4$ bits.

In Option 2 of the sixth example, there may be multiple phase quantization(s) specified (e.g., QPSK, 8PSK, 16PSK). In this example, using x-bit(s) in DCI or using higher layer signaling, the NW may inform the UE of which phase quantization to use. In this case, $q_1^p$ depends on the informed phase quantization. For example, if QPSK is informed then $q_1^p=2$ bits.

In Option 3 of the sixth example, all of the $K_0$ coefficients are quantized with the same phase quantization. Accordingly, in this example $q_0^p=q_1^p$. For example, if QPSK, then $q_0^p=q_1^p=2$ bits or if 8PSK, then $q_0^p=q_1^p=3$ bits.

In Option 4 of the sixth example, if $K_1$ is not configured then the UE may assume and apply Option 3.

Seventh Example: $K_1$ (# of Strongest Coefficients) is Configured by NW

According to one or more embodiments of a seventh example of the present invention, the $K_1$ value can be directly configured by the NW. Alternatively, $K_1$ may be defined as a fraction of $K_0$ such that $K_1$=floor ($p \times K_0$) or $K_1$=ceil ($p \times K_0$) with $p \leq 1$. Additionally, in the aforementioned examples, it is possible that $p=\beta$. Further, specific UE behavior can be summarized as follows.

In Option 1 of the seventh example, the UE assumes $K_1$ to be configured by a higher layer parameter (e.g., from the NW). If the UE is not configured with the value of $K_1$ (or p), the UE assumes $K_1$ is the same as $K_0$. However, the value is not limited to this. It is possible to define other values as well.

In Option 1-1, another value is an integer value which is pre-determined in the 3GPP specification.

In Option 1-2, another value is floor ($p \times K_0$) or ceil ($p \times K_0$), where p is predetermined in the 3GPP specification (e.g., p=1/2).

In Option 2 of the seventh example, the UE assumes to be configured with a set of values for $K_1$ (or p) by higher layer parameter(s) or as indicated by x-bit(s) in DCI such that the UE is informed of which value to use.

In Option 2-1, x may be specified in the 3GPP specifications. For example, x=2.

In Option 2-2, x may be flexible depending on the number of values per one set, which are configured by higher layer signaling. For example, if 4 values per set is configured, the UE assumes 2 bits in DCI. For example, if 8 values per set is configured, the UE assumes 3 bits in DCI.

In Option 3 of the seventh example, the UE assumes a set of values for $K_1$ (or p) is predetermined or otherwise specified in the 3GPP specifications. For example, the UE may assume one value of the set as indicated by x-bit(s) DCI. For example, x may be specified in the 3GPP specification as, e.g., x=2.

Eight Example: When to Identify $K_1$ Strongest Coefficients

According to one or more embodiments of an eighth example of the present invention, one or more scenarios exist for identifying the $K_1$ strongest coefficients.

In Option 1 of the eighth example, $K_1$ strongest coefficients out of $K_0$ may be identified based on the unquantized coefficient amplitudes. For example, let $\tilde{W}$ be the unquantized combination coefficient matrix. In this example, the $K_1$ strongest coefficients are selected by looking at the unquantized coefficient amplitudes.

$$\tilde{W} = \begin{bmatrix} w_{11} & w_{12} & 0 & 0 \\ 0 & w_{22} & w_{23} & w_{24} \\ w_{31} & w_{32} & 0 & w_{34} \\ w_{41} & 0 & w_{43} & w_{44} \end{bmatrix}$$

In Option 2 of the eighth example, $K_1$ strongest coefficients out of $K_0$ may be identified based on the quantized coefficient amplitudes. For example, the first amplitudes of $\tilde{W}$ are quantized. Then, by looking at the quantized amplitudes of $\tilde{W}$, we may arrive at $K_1$ strongest coefficients. It is noted that selecting $K_1$ in this manner may impact only phase quantization.

Figure 5:
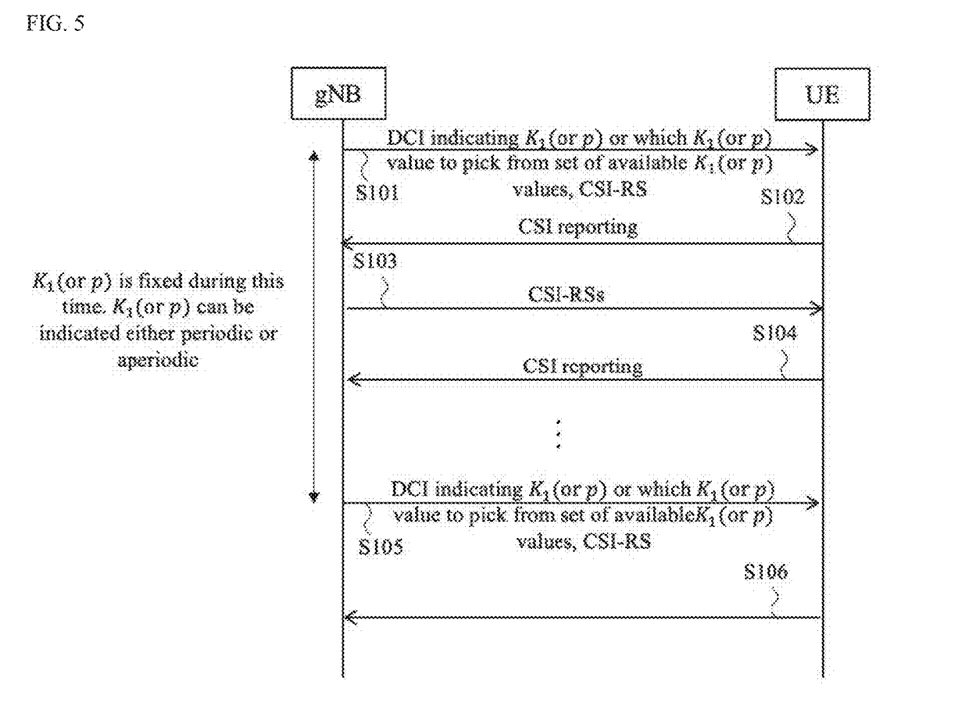
FIG. 5 is a sequence diagram showing an operation in a wireless communication system according to one or more embodiments of a fifth example of the present invention.

FIG. 5 is a sequence diagram showing an example operation where K (leading coefficient) is configured by the NW according one or more embodiments of the fifth example of the present invention.

As shown in FIG. 5, at step S101, the gNB (also referred to as the NW) transmits the DCI indicating $K_1$ (or p) or which $K_1$ (or p) value to pick from set of available $K_1$ (or p) values, and then the NW transmits the CSI-RS.

At step S102, the UE performs CSI reporting based on the CSI-RS using the DCI.

At step S103, the gNB transmits the CSI-RSs.

At step S104, the UE performs CSI reporting based on the CSI-RSs.

At step S105, the gNB transmits the DCI indicating $K_1$ (or p) or which $K_1$ (or p) value to pick from set of available $K_1$ (or p) values, and then the gNB transmits the CSI-RS.

During steps S101-S105, $K_1$ (or p) is fixed during this time. $K_1$ (or p) may be indicated either periodic or aperiodic.

At step S106, the UE performs CSI reporting based on the CSI-RS using the DCI.

The BS 20 according to one or more embodiments of the present invention will be described below with reference to the FIG. 6.

Figure 6:
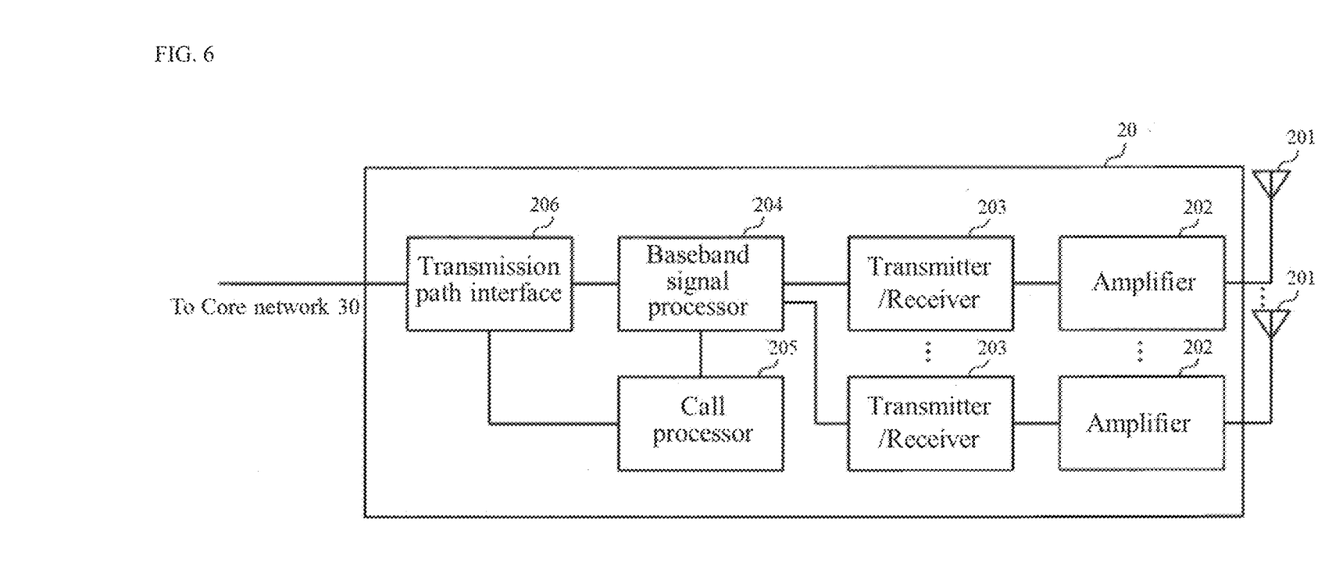
FIG. 6 is a functional block diagram of a base station according to one or more embodiments of the present invention.

As shown in FIG. 6, the BS 20 may comprise an antenna(s) 201 for 3D MIMO, a transmission path interface 206 that may interface with a core network 30, a baseband signal processor 204, a call processor 205, a transmitter/receiver 203, an amplifier 202, a CSI-RS scheduler (not shown), a CS-RS generator (not shown), a precoder (not shown), and a multiplexer (now shown). The transmitter receiver circuit 203 may include a transmitter (TXRU) and a receiver.

The antenna(s) 201 may comprise a multi-dimensional antenna that includes multiple antenna elements such as a 2D antenna (planar antenna) or a 3D antenna such as antennas arranged in a cylindrical shape or antennas arranged in a cube. The antenna(s) 201 includes antenna ports having one or more antenna elements. The beam transmitted from each of the antenna ports is controlled to perform 3D MIMO communication with the UE 10.

The antenna 201 allows the number of antenna elements to be easily increased compared with linear array antenna. MIMO transmission using a large number of antenna elements is expected to further improve system performance. For example, with the 3D beamforming, high beamforming gain is also expected according to an increase in the number of antennas. Furthermore, MIMO transmission is also advantageous in terms of interference reduction, for example, by null point control of beams, and effects such as interference rejection among users in multi-user MIMO can be expected.

The transmitter/receiver 203 generates input signals to amplifier(s) 202 and/or the antenna(s) 201 and performs reception processing of output signals from the antenna(s) 201.

The transmitter included in the transmitter/receiver circuit 203 transmits data signals (for example, reference signals and precoded data signals) via the antenna 201 to the UE 10. The transmitter transmits CSI-RS resource information that indicates a state of the determined CSI-RS resources (for example, subframe configuration ID and mapping information) to the UE 10 via higher layer signaling or lower layer signaling. The transmitter transmits the CSI-RS allocated to the determined CSI-RS resources to the UE 10.

The receiver included in the transmitter/receiver circuit 203 receives data signals (for example, reference signals and the CSI feedback information) via the antenna(s) 201 from the UE 10.

The CSI-RS scheduler determines CSI-RS resources allocated to the CSI-RS. For example, the CSI-RS scheduler determines a CSI-RS subframe that includes the CSI-RS in subframes. The CSI-RS scheduler determines at least an RE that is mapped to the CSI-RS.

The CSI-RS generator generates CSI-RS for estimating the downlink channel states. The CSI-RS generator may generate reference signals defined by the LTE standard, dedicated reference signal (DRS) and Cell-specific Reference Signal (CRS), synchronized signals such as Primary synchronization signal (PSS) and Secondary synchronization signal (SSS), and newly defined signals in addition to CSI-RS The precoder determines a precoder applied to the downlink data signals and the downlink reference signals. The precoder is called a precoding vector or more generally a precoding matrix. The precoder determines the precoding vector (precoding matrix) of the downlink based on the CSI indicating the estimated downlink channel states and the decoded CSI feedback information inputted.

The multiplexer multiplexes CSI-RS on REs based on the determined CSI-RS resources by the CSI-RS scheduler.

The transmitted reference signals may be Cell-specific or UE-specific. For example, the reference signals may be multiplexed on the signal such as PDSCH, and the reference signal may be precoded. Here, by notifying a transmission rank of reference signals to the UE 10, estimation for the channel states may be realized at the suitable rank according to the channel states.

The UE 10 according to one or more embodiments of the present invention will be described below with reference to the FIG. 7.

Figure 7:
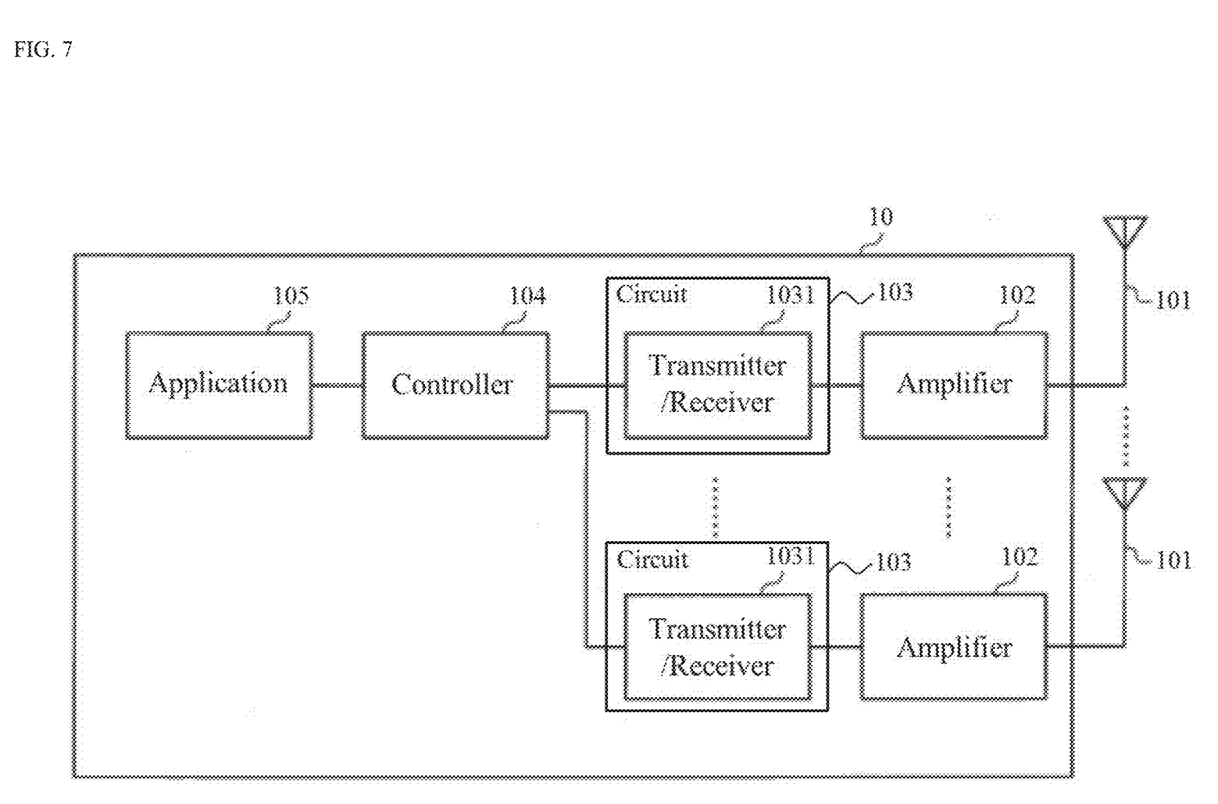
FIG. 7 is a structure diagram of an example of a UE according to one or more embodiments of the present invention.

As shown in FIG. 7, the UE 10 may comprise a UE antenna(s) 101 used for communicating with the BS 20, an application 105, a controller 104, one or more amplifiers 102, a transmitter/receiver circuit 103, a de-multiplexer (not shown), a channel estimator (now shown), CSI feedback controller (not shown), and a CSI-RS controller (not shown). The transmitter/receiver circuit(s) 1031 may include a transmitter and a receiver.

The transmitter included in the transmitter/receiver circuit(s) 103 transmits data signals (for example, reference signals and the CSI feedback information) via the UE antenna(s) 101 to the BS 20.

The receiver included in the transmitter/receiver circuit 103 receives data signals (for example, reference signals such as CSI-RS) via the UE antenna 11 from the BS 20.

The de-multiplexer separates a PDCCH signal from a signal received from the BS 20.

The channel estimator estimates downlink channel states based on the CSI-RS transmitted from the BS 20, and then outputs a CSI feedback controller.

The CSI feedback controller generates the CSI feedback information based on the estimated downlink channel states using the reference signals for estimating downlink channel states. The CSI feedback controller outputs the generated CSI feedback information to the transmitter, and then the transmitter transmits the CSI feedback information to the BS 20. The CSI feedback information may include at least one of Rank Indicator (RI), PMI, CQI, BI and the like.

The CSI-RS controller determines whether the specific user equipment is the user equipment itself based on the CSI-RS resource information when CSI-RS is transmitted from the BS 20. When the CSI-RS controller determines that the specific user equipment is the user equipment itself, the transmitter that CSI feedback based on the CSI-RS to the BS 20.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A terminal comprising:
a processor that performs quantization of $K_1$ coefficients to generate a channel state information (CSI) report; and
a transmitter that transmits the CSI report,
wherein a maximum value of the $K_1$ is $K_0$ and the $K_0$ is obtained by the following formula:

$$K_0 = \lceil \beta \times 2LM \rceil, \beta \in \{3/4, 1/2, 1/4\},$$

where L represents a number of beams and M represents a number of vectors associated with a subband.

2. The terminal according to claim 1, wherein a first table with values indicating a first number of amplitudes and a second table with values indicating a second number of amplitudes that is different from the first number of amplitudes, are configured for quantization of amplitudes in generation of the CSI report.

3. The terminal according to claim 1, wherein the $K_1$ is configured based on a higher layer parameter.

4. A radio communication method for a terminal, comprising:
performing quantization of K1 coefficients to generate a channel state information (CSI) report; and
transmitting the CSI report,
wherein a maximum value of the $K_1$ is $K_0$ and the $K_0$ is obtained by the following formula:

$$K_0 = \lceil \beta \times 2LM \rceil, \beta \in \{3/4, 1/2, 1/4\},$$

where L represents a number of beams and M represents a number of vectors associated with a subband.

5. A system comprising a terminal and a base station, wherein
the terminal comprises:
a processor that performs quantization of K1 coefficients to generate a channel state information (CSI) report; and
a transmitter that transmits the CSI report,
the base station receives the CSI report,
wherein a maximum value of the $K_1$ is $K_0$ and the $K_0$ is obtained by the following formula:

$$K_0 = \lceil \beta \times 2LM \rceil, \beta \in \{3/4, 1/2, 1/4\},$$

where L represents a number of beams and M represents a number of vectors associated with a subband.

* * * * *